Jan. 9, 1951 G. GUANELLA 2,537,132

SUPERREGENERATIVE RECEIVER

Filed Sept. 7, 1945 3 Sheets-Sheet 1

INVENTOR
GUSTAV GUANELLA
BY
[signature]
ATTORNEY

Jan. 9, 1951 G. GUANELLA 2,537,132
SUPERREGENERATIVE RECEIVER
Filed Sept. 7, 1945 3 Sheets-Sheet 2
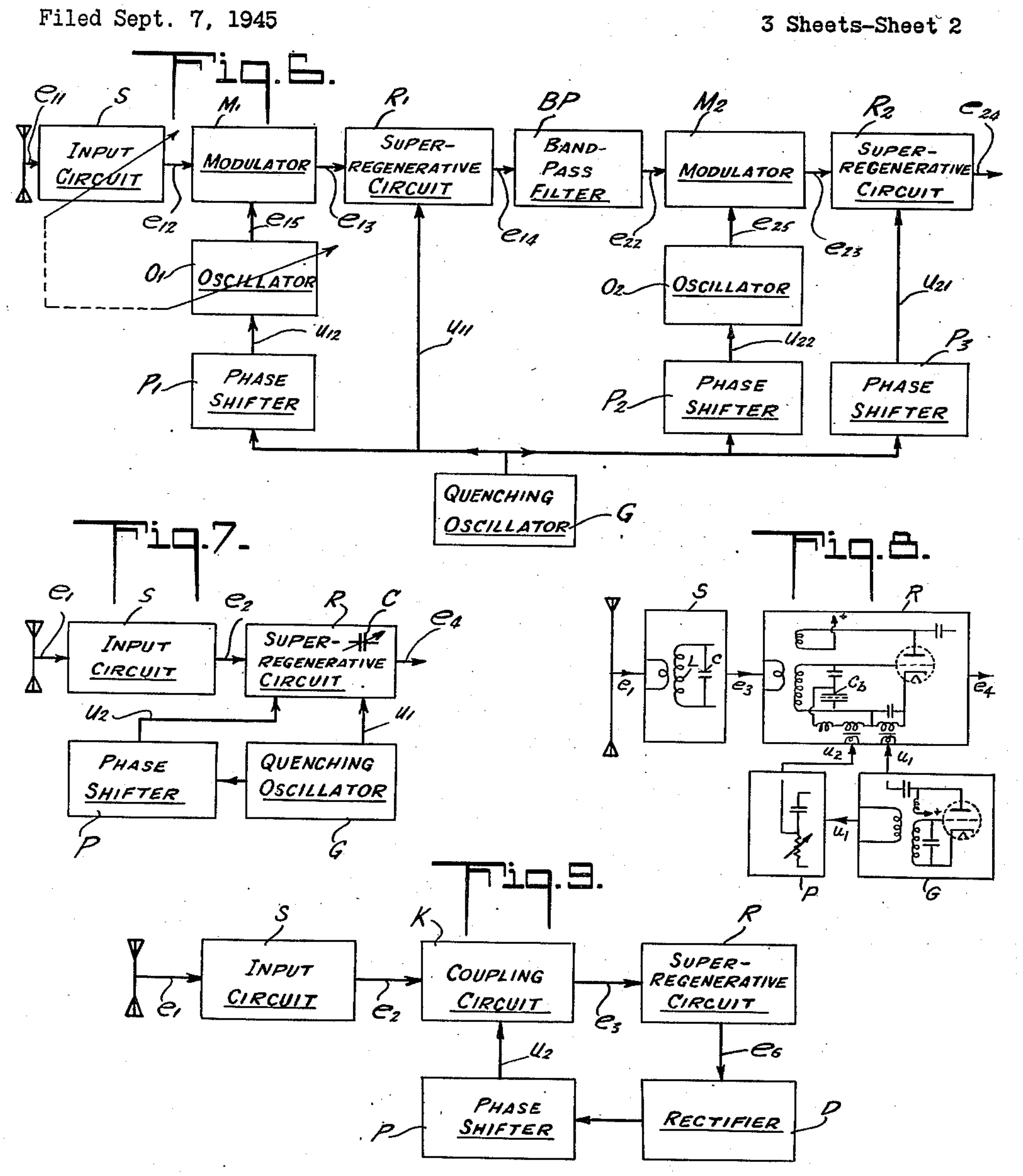
FIG. 6, FIG. 7, FIG. 8, FIG. 9
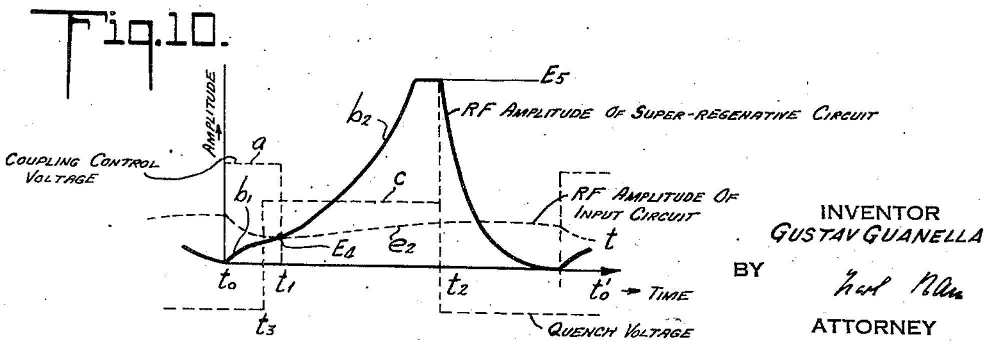
INVENTOR
GUSTAV GUANELLA
BY [signature]
ATTORNEY Jan. 9, 1951 G. GUANELLA 2,537,132

SUPERREGENERATIVE RECEIVER

Filed Sept. 7, 1945 3 Sheets-Sheet 3

INVENTOR
GUSTAV GUANELLA
BY Karl Nau
ATTORNEY

Patented Jan. 9, 1951 2,537,132

UNITED STATES PATENT OFFICE 2,537,132

SUPERREGENERATIVE RECEIVER

Gustav Guanella, Zurich, Switzerland, assignor to Radio Patents Corporation, New York, N. Y., a corporation of New York Application September 7, 1945, Serial No. 614,858
In Switzerland September 11, 1944

10 Claims. (Cl. 250—20)

The present invention relates to a super-regenerative high frequency amplifier and a method of operating same for use in connection with radio receivers and equivalent devices to efficiently amplify an incoming signal with a minimum of weight and bulk of apparatus required.

For the reception of short and ultra short waves it is advantageous to use super-regenerative receivers. They enable great sensitivity to be obtained with a minimum amount of apparatus. With a single tube it is possible to obtain amplifications which would normally require two to three amplifier stages. A disadvantage of such receivers is, however, their lack of selectivity. Another considerable drawback is the emission of the built-up energy, whereby neighbouring receivers are disturbed. Attempts have been made to eliminate this disadvantage by using an amplifier tube as a preliminary stage. This arrangement possesses the disadvantage that the receiver tuning circuit is pre-loaded due to the tube of the preliminary stage; furthermore this pre-amplification prevents the full benefit of the supper-regenerative receiver from being obtained, because the latter is particularly sensitive when the voltages are small.

The present invention concerns a receiver arrangement with super-regenerative amplification, wherein the input circuit is periodically coupled with and decoupled from the oscillatory circuit of the super-regenerative amplifier in synchronism with the quench frequency, so that a return flow of the built-up energy in the oscillatory circuit of the super-regenerative receiver to the input circuit is prevented.

The periodic coupling variation thus serves to enable energy to be transmitted only in the direction towards the super-regenerative receiver. The coupling is controlled in such a manner that it is establshed at the instant when the energy in the damped oscillatory circuit has already died down and the building-up process has started. The coupling prevails until the energy which builds up due to the feed back is about equal to the input energy. At this moment the input is disconnected. The oscillation energy continues to build up until the feed back is put out of operation by the quench frequency and the oscillations allowed to die down due to the increasing damping effect. The input end remains disconnected during this time. It is therefore impossible for energy from the oscillatory circuit to flow back to the input circuit and thus cause disturbances by radiation from the antenna. The switching in and out of the input side thus occurs in synchronism with the control of the building-up and damping process of the oscillations, but with a certain phase displacement. In this connection it is, however, important that the coupling time should be very small compared with the blocking time. The coupling time is generally only from 1 to 10% of a whole oscillation or quenching period. The result of this would be that only a fraction of the energy in the input circuit could actually be supplied to the oscillatory receiving circuit. The time utilisation factor and thus the efficiency of the coupling would therefore be very poor. This disadvantage can, however, be at least partly overcome if a slightly damped oscillatory circuit is provided at the inlet of the arrangement. By this means, nearly all the receiving power coming from the antenna becomes stored in the input oscillatory circuit during the duration of an oscillation period of the receiver and is discharged upon the oscillatory circuit of the receiver during the short coupling period.

It is advisable that the figure of merit of the oscillatory circuit, as the ratio of the blocking time to the coupling time, should be greater than that of the damped super-regenerative receiver. The resonance resistances of both circuits should be in the same ratio. By this means a considerable part of the receiving energy existing in the input oscillatory circuit will be transmitted to the oscillatory circuit of the super-regenerative receiver, so that the sensitivity and quality of the reception with regard to noise level, are considerably improved.

A particularly effective method of producing a variable coupling consists in the use of the well-known heterodyne principle, whereby the oscillation of the input oscillatory circuit is superposed upon the oscillation impulses of an auxiliary oscillator in a modulator, for instance a mixing tube, so that short modulation products (consisting of sum and difference frequencies) are produced. The super-regenerative oscillation tube is tuned to the sum or difference frequency so that a control only occurs during the short duration of the oscillation impulses of the oscillator. The two oscillations may be intermodulated by means of a diode modulator, if the diode is properly biassed so as not to act as a load on the input oscillatory circuit. The intermittent formation of the modulation products may also be obtained with a continuously oscillating auxiliary oscillator if an amplifier controlled by impulses is located between the oscillator and modulator or if the modulator is additionally controlled with direct current impulses so as to be blocked intermittently.

Another method of obtaining a variable coupling consists in periodically varying the tuning of the oscillator tube. When the building-up process commences, this tuning coincides with the receiving frequency; the tuning is altered after the first building-up process, so that the oscillation continuing from the already existing amplitude builds up still further with the new frequency. In this case due to the unequal tuning frequencies of both circuits the oscillator exerts practically no reverse effect on the input oscillatory circuit.

The periodic control of the coupling, that is the transmission from the input circuit to the oscillatory circuit of the super-regenerative receiver, is achieved with the same quenching voltage source as is used for the super-regeneration. A special generator may be used for this purpose or the super-regenerative oscillator of the receiver may be used to produce the quenching frequency. Part of the quenching frequency energy is used for controlling the coupling. The impulse voltage for the periodic control of the coupling may also be produced by rectifying the output voltage of the super-regenerative circuit.

The invention, as to its novel objects and aspects, will become more apparent as the following detailed description proceeds, taken in reference to the accompanying drawings forming part of this specification, and wherein:

Figs. 6–9 are block diagrams illustrating additional modifications and various features of improvements according to the invention;

Fig. 10 is a theoretical diagram explanatory of the preferred adjustment and function of the invention.

Like reference characters identify like parts throughout the different views of the drawings.

Figure 1:
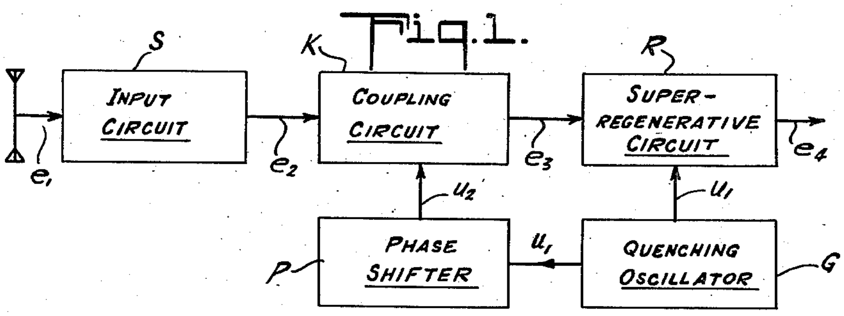
Fig. 1 is a block diagram of a super-regenerative receiving system embodying the principles of the invention.

The way in which the present invention may be realized in practice is now explained by reference to the constructional examples shown in the accompanying drawings. In the figures the input circuit is indicated by S. The band width of this circuit which may be an oscillatory circuit or be made up of coupled resonance circuits, only needs to exceed the band width of the receiving signal to a slight extent. R is the super-regenerative circuit including a tuning circuit the damping of which is compensated periodically by the control impulses $u_1$ of the quenching generator G. The same quenching generator supplies the control voltage $u_2$ whose variation in time and phase displacement compared with that of $u_1$ are controlled by the phase-shifting circuit P. In Fig. 1, K represents a coupling circuit whose transmission ratio is controlled by $u_2$ so that the input voltage $e_3$ of super-regenerative circuit R is obtained at periodic intervals from the output oscillations $e_2$ of the input circuit S.

Figure 2:
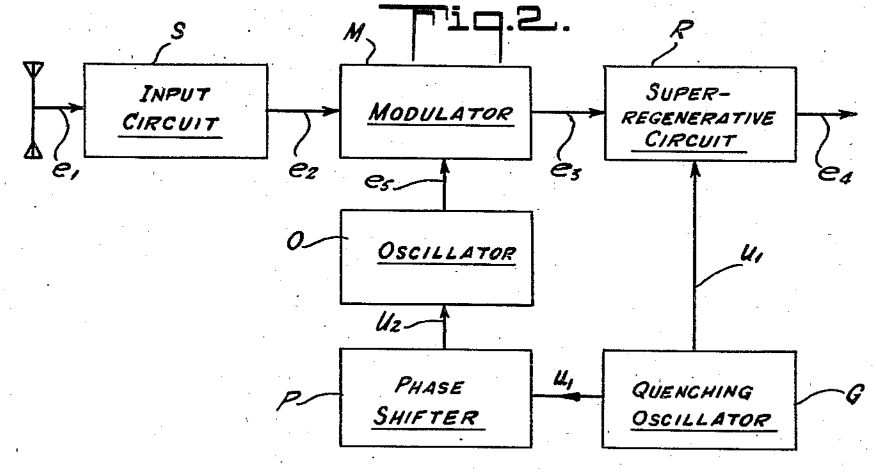
Fig. 2 is a similar diagram showing a modification of the invention.
Figures 3, 4, 5:
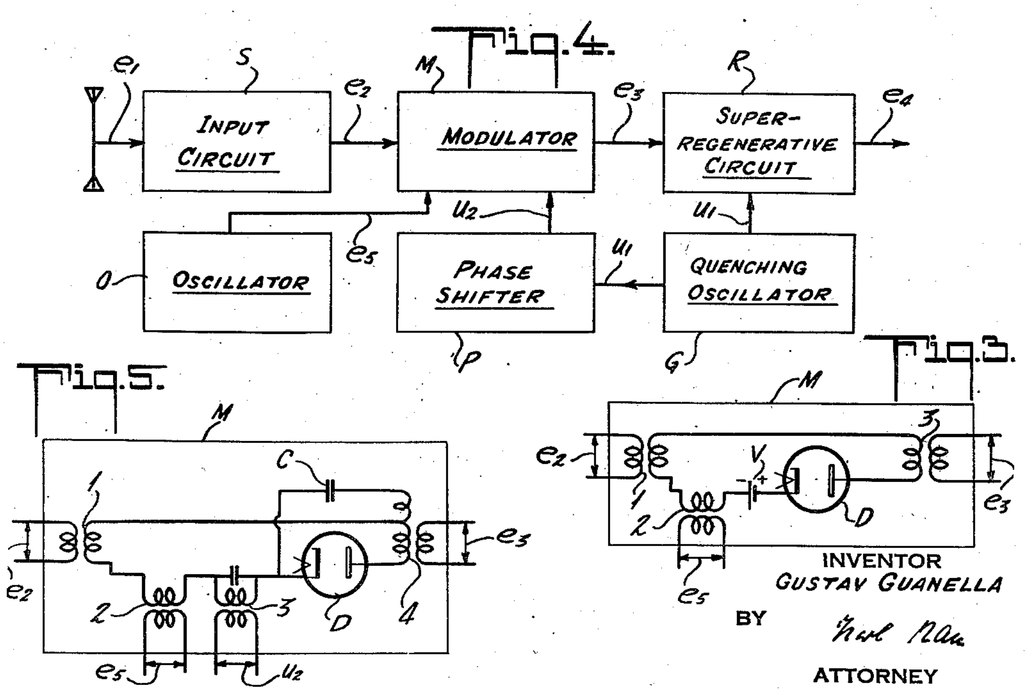
Fig. 3 is a circuit diagram showing a variable coupling circuit used in connection with the invention.
Fig. 4 is a block diagram of a radio receiver illustrating another modification of the invention.
Fig. 5 is a circuit diagram showing a combined converter and coupling circuit suitable for use with Fig. 4.

In Fig. 2 the input circuit S may be a slightly damped oscillatory circuit. In this case, variable coupling is obtained by means of a frequency change in modulator M produced by the periodically interrupted auxiliary voltage $e_5$ of the heterodyne oscillator O which is keyed by $u_2$. The oscillatory circuit in R is for instance tuned to the difference frequency of $e_1$ and $e_5$. A diode D as shown in Fig. 3 may be used for the modulation. In this case, a bias voltage V is then used to ensure that the diode damping is as small as possible during the keying intervals in order that undesirable loading of the output oscillatory circuit S is avoided. Transformers 1, 2, 3 are located in the diode circuit. Transformer 1 applies the input voltage $e_2$, transformer 2 applies the oscillator voltage $e_5$, and transformer 3 transmits the voltage of the modulation product to the super-regenerative circuit R.

Fig. 4 shows a modulator M excited by an unkeyed auxiliary voltage $e_5$ and keyed separately by the control impulses $u_2$. This may be accomplished by means of the arrangement shown in Fig. 5, wherein similar to Fig. 3 there is provided a diode D and transformers 1, 2 for the input voltage $e_2$ and oscillator voltage $e_5$, respectively. The control impulses $u_2$ are supplied by a separate transformer 3. Transformer 4 serves to transmit the modulation or intermediate frequency voltage. It is desirable to compensate the capacitance of the blocked diode D; this may be achieved by means of condenser C, whereby the winding on the diode side of transformer 4 possesses a number of turns from which the neutralizing voltage for the condenser is obtained.

The present invention may also be practiced in such a manner that the amplification process is divided into two or more amplification stages. Fig. 6 shows an arrangement for a two-stage amplifier. A band-pass filter BP is provided in the output of the first super-regenerative stage $R_1$ for suppressing disturbing frequencies. It is important that the control voltages $u_{11}$, $u_{12}$, $u_{21}$, and $u_{22}$ should have the correct mutual phase position. The build-up in $R_2$ occurs preferably when $R_1$ attains its maximum amplitude. At this instant, oscillator $O_2$ should be made to oscillate by means of $u_{22}$. Tuning to the desired input frequency may be achieved by a corresponding adjustment of the input oscillatory circuit S and a simultaneous adjustment of $O_1$, such as by means of synchronous regulating devices, so that the other circuits remain tuned to a constant frequency.

Another example of the invention using a periodically variable tuning of R is shown in Fig. 7 in diagrammatic form. In this case a reactance in the oscillator tuning circuit which determines the frequency, such as a capacitance C, is varied in dependence on control voltage $u_2$.

Fig. 8 shows an arrangement according to Fig. 7 in greater detail, using conventional circuits and elements well known in the art for performing the various functions involved. The resonant input circuit S comprising in a known manner an inductance L shunted by a condenser C is tuned to the frequency of the signal oscillation which it is desired to receive, while the tuning of the super-regenerative circuit R is periodically varied in synchronism with the control voltage $u_2$ derived from the quenching voltage $u_1$ of the quench oscillator G by means of the phase-shifting circuit P. The latter is shown to comprise a known series connection of a condenser and variable resistor to obtain a desired phase rotation, in a manner well understood. More specifically, the frequency control voltage $u_2$, in the example shown, varies the capacity of a voltage-controlled blocking layer condenser $C_b$ which forms an effective tuning element of the super-regenerative circuit R, the capacity of condenser $C_b$ being a function of the applied bias voltage in the manner described and explained in greater detail in my U. S. Patent 2,182,377.

If the tuning adjustment of the super-regenerative circuit R differs from the tuning adjustment of the input circuit S, the latter will practically not be damped by the receiver and a return flow of oscillatory energy from the receiver R to the antenna is substantially prevented. During this period, received signal energy will be stored in the input circuit S. As soon, however, as the tuning adjustment of the receiver R temporarily equals the tuning adjustment of the input circuit S, due to the periodic control by the frequency control voltage $u_2$, the energy stored in the input circuit will be impressed upon the super-regenerative amplifier, thus initiating a rapid build-up of the oscillation. After the oscillation in the circuit R has attained a certain amplitude, its tuning adjustment is changed to a value differing from the tuning of the input circuit S, whereupon the oscillations will continue to build up at the new or changed frequency. The quench oscillator G as shown is a standard regenerative feedback oscillator energizing both the receiver R to produce super-regeneration and the phase shifter B for producing the frequency control voltage $u_2$, in the manner described.

In such cases where the receiver should be as simple as possible the auxiliary generator G for producing the quench voltage may be omitted. The oscillator of stage R is then used in a known manner, the oscillatory circuit for the quench frequency being in the anode circuit of the oscillator. Another possible arrangement is shown in Fig. 9. The control voltage $u_2$ for influencing the coupling is obtained in this case by rectifying the output voltage $e_6$ of the super-regenerative circuit R in D and correcting its phase in P.

The invention may also be applied to other simplified arrangements. By using multiple tubes and/or arrangements with multi-electrode tubes it is possible to combine several functions of the arrangements already described in one and the same tube. Thus for instance the functions of $M_1$, $R_1$, $O_1$ or $M_2$, $R_2$, $O_2$ in Fig. 6 may be combined in a single tube.

Fig. 10 shows the sequence in time of the various functions. In this figure *a* shows the course of the coupling control voltage $u_2$, that is the variation of the coupling between S and R. The oscillation of the super-regenerative circuit builds up in accordance with the amplitude of the input oscillation $e_1$ or $e_2$ until voltage $E_4$ is reached and the coupling interrupted at the instant $t_1$, this process being represented by the part of the curve $b_1$. Here or somewhat sooner at $t_3$ the damping of the circuit in R is removed and the further build-up follows an exponential law as represented by the envelope $b_2$, until the maximum amplitude $E_5$ is reached. The control voltage $u_2$ of the quench oscillator for instance follows a curve *c* so that from the instant $t_2$ the oscillation of the oscillator tube is damped again. Due to the blocking of the transmission during in the interval $t_2$—$t_0'$ the effect of the built-up oscillation of the super-regenerative circuit R on the input circuit is to a large extent avoided.

All the described arrangements may be used for the reception of amplitude-modulated oscillations. In principle it is also possible to amplify frequency-modulated oscillations with a super-regenerative receiver. In this case the rectifier for the demodulation is replaced by a device for converting frequency variations into voltage variations. The quench frequency must then be considerably higher and lie between 20–40 kilocycles per second. It must also be several times higher than the intermediate frequency which is used, and furthermore so high, or its oscillation period must be so small, that the phase difference between the built-up oscillation of the super-regenerative circuit and the input oscillation is less than 180°.

The invention can also be applied to phase-modulated oscillations. A similar arrangement can then be used as with frequency-modulated oscillations.

Figure 11:
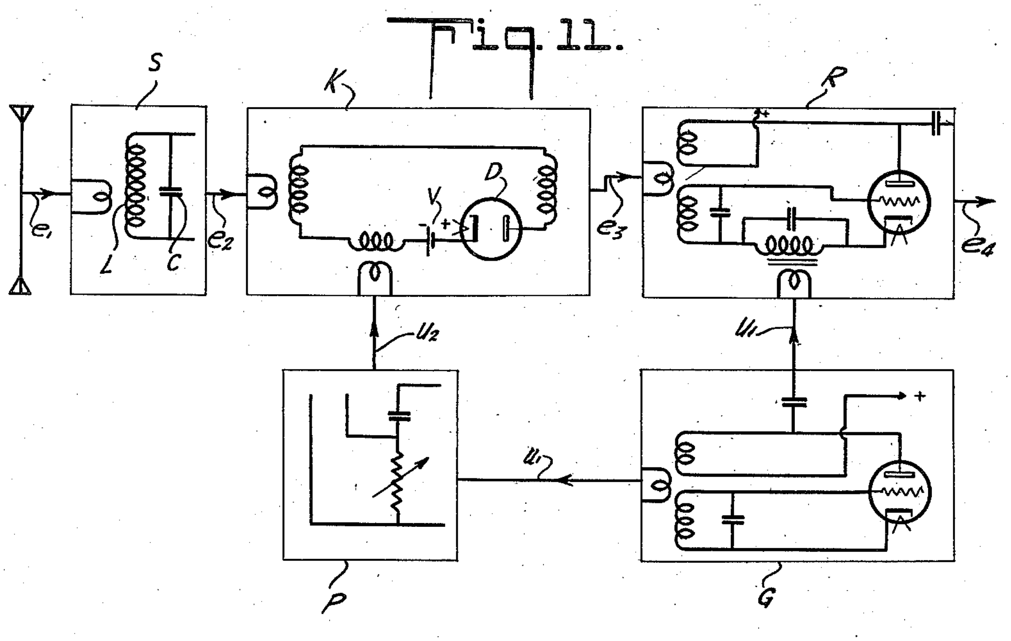
Figs. 11 and 12, corresponding respectively to Figs. 1 and 4, show in greater detail and semi-schematic manner complete circuit arrangements for practicing the invention.

The block diagram of Fig. 1 is reproduced in Fig. 11 showing in greater detail the individual circuit arrangements. The input circuit S includes a parallel oscillatory circuit having a self-inductance L and condenser C. Coupling circuit K contains a diode D for the periodic interruption of the transmitted high frequency oscillation. This diode is normally blocked by the bias voltage provided by the voltage source V. Control impulses $u_2$ render the tube D intermittently conductive. The super-regenerative amplifier R contains an electron tube $Q_1$ in feedback arrangement, the grid voltage of this tube being rendered periodically negative by the quenching impulses $u_1$ so that the built-up oscillation is periodically interrupted. The quenching voltage $u_1$ is produced by the auxiliary generator G which may contain an electron tube in feedback arrangement. The series-connected condenser and resistance of the phase-rotating circuit P serves to obtain the phase-displaced coupling control voltage $u_2$.

Figure 12:
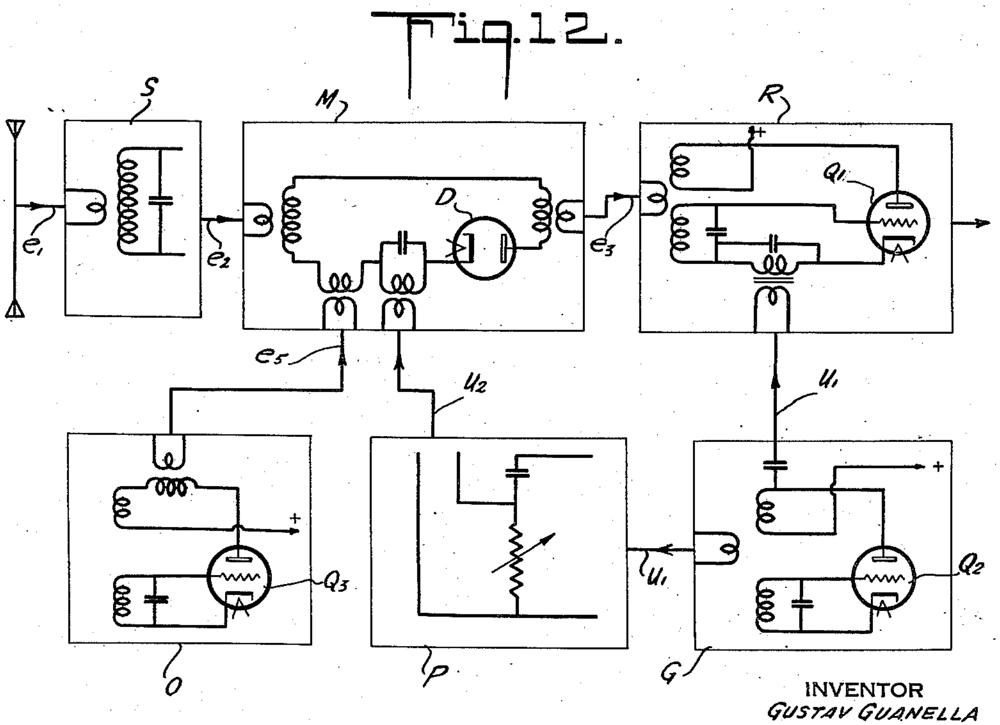

The detailed arrangement shown in Fig. 12 corresponds to the block diagram of Fig. 4. In this case modulator M includes an heterodyne diode D as shown in Fig. 5 which is periodically blocked by the control voltage $u_2$. Super-regenerative amplifier R may correspond to the amplifier shown in Fig. 11 and similarly the auxiliary voltage generator G and the phase-rotating circuit P. The heterodyne auxiliary frequency $e_5$ is produced by oscillator O comprising an electron tube $Q_3$ in feedback arrangement.

I claim:

1. In a high frequency system, a tuned input circuit, a super-regenerative feedback amplifier comprising a resonant circuit and quenching means for amplifying a received radio signal by super-regeneration during alternate oscillating and non-oscillating periods of said resonant circuit, a frequency converter including a heterodyning oscillator and interconnecting said input circuit and said amplifier for changing the input frequency to a predetermined intermediate frequency, and means for electrically controlling the coupling of said converter with said amplifier in synchronism with the quenching frequency, to substantially prevent a return flow of built-up energy from said amplifier to said input circuit during the oscillating periods of said resonant circuit.

2. In a high frequency system, a tuned input circuit, a super-regenerative feedback amplifier comprising a resonant circuit and a separate quenching oscillator for amplifying a received radio signal by super-regeneration during alternate oscillating and non-oscillating periods of said resonant circuit, a frequency converter including a heterodyning oscillator and connected between said input circuit and said amplifier for changing the input frequency to a predetermined intermediate frequency, and circuit connections including phase-shifting means between said quenching oscillator and said converter for controlling the output of said converter in synchronism with the quenching frequency, whereby to substantially prevent a return flow of built-up energy from said amplifier to said input circuit during the oscillating periods of said resonant circuit.

3. In a high frequency system, a tuned input circuit, a super-regenerative feedback amplifier comprising a resonant circuit and quenching means for amplifying a received radio signal by super-regeneration during alternate oscillating and non-oscillating periods of said resonant circuit, a combined frequency converter and coupling circuit including a biased rectifier and interconnecting said input circuit with said amplifier, a heterodyning oscillator coupled with said converter to change the input frequency to a predetermined intermediate frequency applied to said amplifier, and further means for applying quenching frequency energy to said converter circuit, whereby to control the coupling thereof with said amplifier to substantially reduce the return flow of built-up energy from said amplifier to said input circuit during the oscillating periods of said resonant circuit.

4. In a radio system, an input circuit, a super-regenerative amplifier comprising an oscillatory circuit and a quenching oscillator, to cause periodic oscillating and non-oscillating periods of said oscillatory circuit during the alternate half-cycles of said quenching oscillator for amplifying a received radio signal by super-regeneration during said oscillating periods, electrically controllable coupling means connecting said input circuit with said amplifier, and phase-shifting means connecting said quenching oscillator and said coupling means, to substantially suppress coupling between said input circuit and said oscillatory circuit during said oscillating periods, to thereby prevent a return flow of oscillation energy from said amplifier to said input circuit.

5. In a radio system, an input circuit, a super-regenerative feedback amplifier comprising a resonant circuit and a quenching oscillator for amplifying a received radio signal by super-regeneration during alternate oscillating and non-oscillating periods of said resonant circuit, a frequency converter connecting said input circuit with said amplifier and including a heterodyning oscillator for changing the input frequency to a pre-determined intermediate frequency, and means for periodically controlling the transmission characteristic of said converter in synchronism with the quenching frequency, to periodically reduce the coupling between said converter and said amplifier and to apply relatively short intermediate frequency energy pulses from said converter to said amplifier prior to the oscillation build-up periods of said resonant circuit, to thereby substantially prevent a return flow of oscillation energy from said amplifier to said converter.

6. In a radio receiving system, an input circuit, a super-regenerative amplifier including an oscillatory circuit and quenching means, to cause periodic oscillating and non-oscillating periods of said oscillatory circuit during the alternate half-cycles of said quenching means, for amplifying a received radio signal by super-regeneration during said oscillating periods, coupling means between said input circuit and said amplifier, and means for controlling the effectiveness of said coupling means in synchronism with and in predetermined phase relation to the quenching frequency, to substantially suppress coupling between said input circuit and said oscillatory circuit during said oscillating periods to thereby prevent a return flow of oscillation energy from said amplifier to said input circuit.

7. In a radio receiving system, a tuned input circuit, a super-regenerative amplifier comprising an oscillatory circuit and quenching means, to cause periodic oscillating and non-oscillating periods of said oscillatory circuit during the alternate half-cycles of said quenching means, for amplifying a received radio signal by super-regeneration during the oscillating periods of said oscillatory circuit, and means for controlling the tuning of said oscillatory circuit in synchronism with and in pre-determined phase relation to the quenching frequency, to substantially suppress coupling between said input circuit and said amplifier during said oscillating periods, to prevent a return flow of oscillation energy to said input circuit.

8. In a radio receiving system, a tuned input circuit, a super-regenerative amplifier comprising an oscillatory circuit and quenching means to cause periodic oscillating and non-oscillating periods of said oscillatory circuit during the alternate half-cycles of said quenching means, for amplifying a received radio signal by super-regeneration during the oscillating periods of said oscillatory circuit, means including phase-shifting means for producing a periodic control voltage in synchronism with the quenching frequency, and means for controlling the tuning of said resonant circuit by said control voltage, to substantially suppress coupling between said input circuit and said amplifier during said oscillating periods, to thereby prevent a return flow of oscillation energy to said input circuit during the detuning of said amplifier.

9. In a radio receiving system, an input circuit, a super-regenerative amplifier comprising an oscillatory circuit and quenching means to cause periodic oscillating and non-oscillating periods of said oscillatory circuit during the alternate half-cycles of said quenching means, for amplifying a received radio signal by super-regeneration during the oscillating periods of said oscillatory circuit, coupling means between said input circuit and said amplifier, means for deriving control energy varying in synchronism with the quenching frequency, and further means responsive to said control energy for periodically suppressing the energy transfer by said coupling means upon lapse of pre-determined intervals following the beginning of said oscillating periods, to thereby prevent a return flow of oscillation energy from said amplifier to said input circuit.

10. In a radio receiving system, an input circuit, a super-regenerative amplifier comprising an oscillatory circuit and quenching means to cause periodic oscillating and non-oscillating periods of said oscillatory circuit during the alternate half-cycles of said quenching means, for amplifying a received radio signal by super-regeneration during the oscillating periods of said oscillatory circuit, coupling means between said input circuit and said amplifier, means including phase-shifting means for deriving control energy from said amplifier in synchronism with and at pre-determined phase relation to the quenching frequency, and further means responsive to said control energy for periodically suppressing the energy transfer by said coupling means upon lapse of pre-determined time intervals following the beginning of said oscillating periods, to substantially prevent a return flow of oscillation energy from said amplifier to said input circuit.

GUSTAV GUANELLA.

REFERENCES CITED

The following references are of record in the file of this patent:

UNITED STATES PATENTS

| Number | Name | Date |
|---|---|---|
| 1,424,065 | Armstrong | July 25, 1922 |
| 2,129,820 | Chaffee | Sept. 13, 1938 |
| 2,154,723 | Brown | Apr. 18, 1939 |
| 2,157,312 | Wright | May 9, 1939 |
| 2,182,377 | Guanella | Dec. 5, 1939 |
| 2,351,193 | Crosby | June 13, 1944 |
| 2,415,316 | Wheeler | Feb. 4, 1947 |
| 2,416,794 | Crosby | Mar. 4, 1947 |